UNITED STATES PATENT OFFICE.

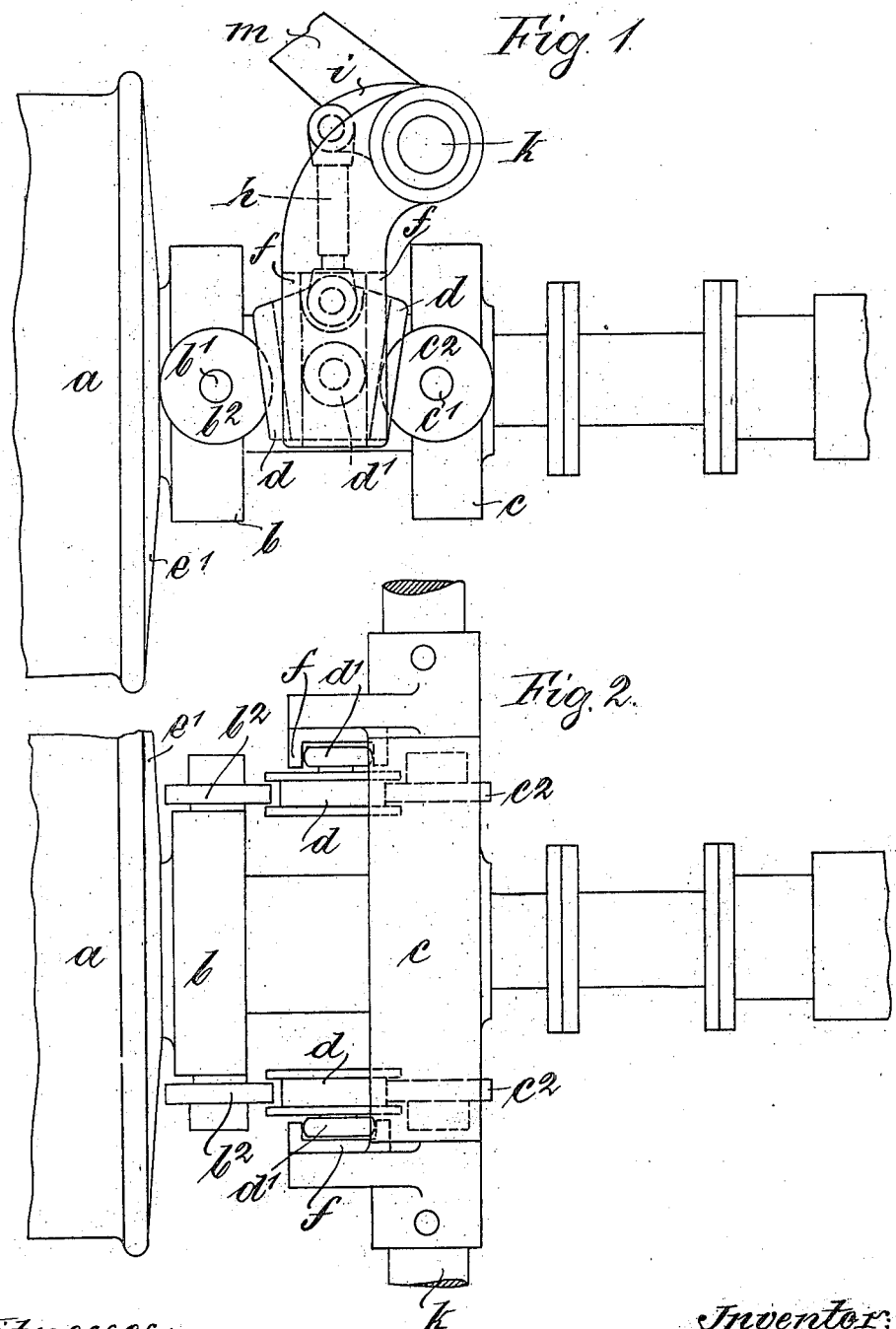

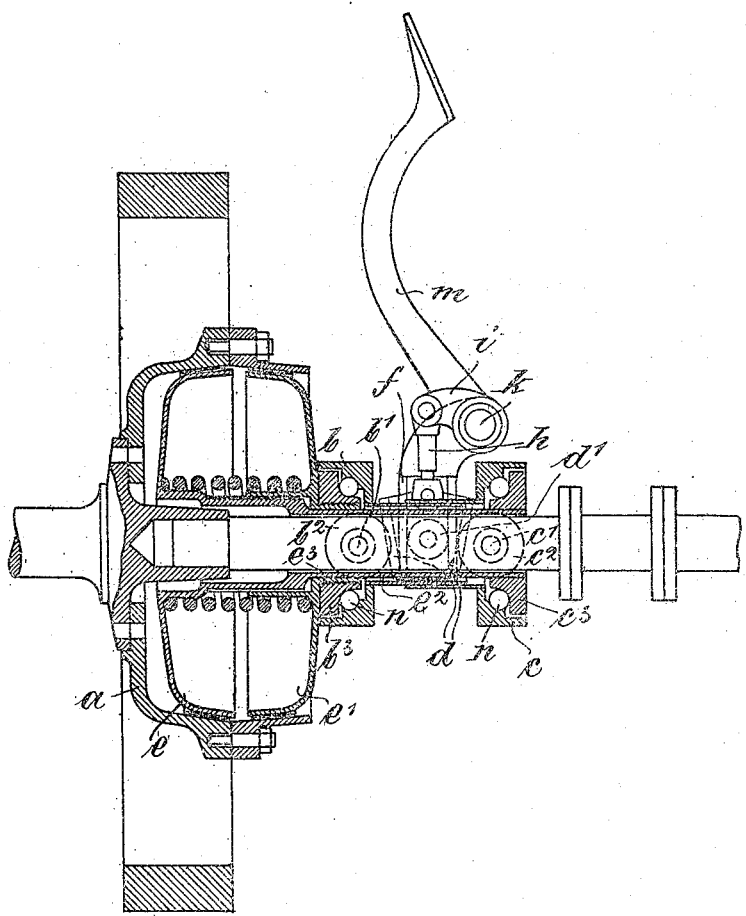

PAUL DAIMLER, OF CANNSTATT, GERMANY, ASSIGNOR TO DAIMLER MOTORENGESELL-SCHAFT, OF STUTTGART, GERMANY, A FIRM.

CLUTCH-ACTUATING MECHANISM.

1,045,527.  Specification of Letters Patent.  Patented Nov. 26, 1912.

Application filed June 10, 1912. Serial No. 702,804.

*To all whom it may concern:*

Be it known that I, PAUL DAIMLER, a subject of the King of Wurttemberg, and resident of 87 Waiblingerstrasse, Cannstatt, in the Kingdom of Wurttemberg, German Empire, have invented certain new and Improved Clutch-Actuating Mechanism, of which the following is a specification.

This invention relates to a clutch actuating mechanism of the type described in the specification of my prior United States Patent application Serial No. 649,763 filed September 16th 1911 in which the clutch consists of two friction cones slidably movable in opposite directions on one shaft to be coupled and which are adapted under the action of a spring to engage friction surfaces carried by the other shaft to be coupled the cones being provided with concentrically and laterally projecting hubs upon each of which a ring or other suitable non-rotatable member is provided, the latter being forced apart by means of wedges connected to an operating lever so as to disengage the clutch.

It has now been found, that in many cases it is not desirable to throw both the friction cones simultaneously into engagement with their corresponding friction surfaces but to allow the friction cones to make frictional contact successively. By this means a certain amount of flexibility on the part of the clutch is enabled when throwing the clutch into engagement as when only one of the friction cones is in engagement with its friction surface, a certain amount of slip is possible so that the full velocity is gradually imparted to the shaft to be driven.

In carrying out my invention the wedge is guided during its movement in such a manner that when the clutch is to be disengaged, the two friction cones are withdrawn one after the other from their friction surfaces and on releasing the actuating mechanism to again throw the clutch into engagement, the friction cones make frictional contact with their friction surfaces in succession. By this arrangement, it is possible, on suddenly releasing the actuating mechanism, to bring the two friction clutches into engagement in direct succession although not exactly simultaneously and thus to obtain an almost instantaneous coupling while when it is desired to gradually couple the shafts together, the actuating mechanism may be gradually released so as to first of all allow one of the friction cones to engage and thus impart a certain velocity to the shaft to be coupled and then allow the second friction cone to engage.

According to the present invention the wedges are preferably guided in their movement by means of stationary guide-ways or the like which are so arranged that when the clutch is fully in engagement, one inclined surface of the wedge contacts with one of the rings or like non-rotatable members on the hub of one of the cones while the other inclined surface of the wedge is out of contact with the ring or like member on the other hub. On the drawings I have illustrated this method of guiding the wedges by way of example.

Figure 1 is a side-view of the clutch actuating mechanism and Fig. 2 is a plan view thereof. Fig. 3 is a vertical section through the clutch and its actuating mechanism.

$a$ indicates the casing of the clutch whose interior surface constitutes a double frusto-conical friction surface.

$e$, $e'$ are frusto-conical friction members coöperating with the interior surface of the casing $a$ and having laterally projecting hubs $e^2$ and $e^3$ respectively, arranged concentrically the one within the other. Secured on the outer end of the inner hub $e^2$ is a ball ring $c^3$ and mounted on the hub $e^3$ is another ball ring $b^3$, these ball rings $b^3$, $c^3$, coöperating with loose rings $b$ and $c$ respectively and balls $n$ to form ball bearings, the loose rings $b$ and $c$ being secured against rotation in any suitable manner and being provided with pins $b'$ and $c'$ respectively, on which are rotatably mounted rollers $b^2$ and $c^2$ respectively. Between each pair of rollers $b^2$ and $c^2$ engages a wedge $d$ which is carried by means of articulated connecting rods $h$ which are also articulated to cranks $i$ on the shaft $k$ of a disengaging lever $m$.

Rotatably secured laterally of the wedges $d$ are rollers $d'$ vertically movable in stationary guide-ways $f$ depending from the shaft $k$ or from any other suitable fixed part. The guide-ways $f$ are arranged in such a position that, when the clutch is in engagement (which is the position shown on the drawings), they are somewhat nearer the pins $c'$ than the pins $b'$ and, as the position of the wedge $d$ is determined by the position of the guide-ways $f$, by reason of the rollers $d'$ secured to the wedges $d$ moving in the guide-ways $f$, one inclined surface of the wedge $d$ will engage the roller $c^2$, when the clutch is in engagement, while the other inclined surface of the wedge $d$ will be out of contact with the roller $b^2$, as shown on the drawings.

In the position illustrated in the drawings, the friction cones $e'$ and $e^2$ are both in engagement with the frictional surface of the casing $a$, the actuating mechanism in this position being so arranged that the wedges $d$ contact with the rollers $c^2$ but are out of contact with the rollers $b^2$. On depressing the actuating lever $m$, the wedges $d$ are forced downwardly through the medium of the cranks $i$ and connecting rods $h$ and owing to the movement of the rollers $d'$ being guided by the guideways $f$, the ring $c$ is first of all moved outward so as to disengage the friction cone $e$ from its surface. On further downward movement of the wedges $d$, the latter contact with the rollers $b^2$ and thereupon withdraw the friction cone $e'$ from its friction surface. On releasing the lever $m$ the movement of the parts is reversed, that is to say, the friction cone $e'$ is first brought into engagement with its friction surface and thereafter the friction cone $e$ likewise brought into engagement.

I claim:—

1. The combination with a double cone friction clutch having two friction cones slidably movable in opposite directions on one shaft to be coupled, a spring between said cones, friction surfaces carried by the other shaft to be coupled, concentrically and laterally projecting hubs on said cones, members prevented from rotation on said hubs, a wedge between said members and a disengaging lever connected to said wedge; of fixed means for guiding said wedge so that, on actuating said lever in one direction, said wedge causes the two friction cones to engage one after the other with the friction surfaces and to disengage one after the other from said friction surfaces on actuating said lever in the other direction.

2. The combination with a double cone friction clutch having two friction cones slidably movable in opposite directions on one shaft to be coupled, a spring between said cones, friction surfaces carried by the other shaft to be coupled, concentrically and laterally projecting hubs on said cones, members prevented from rotation on said hubs, a wedge between said members and a disengaging lever connected to said wedge; of means for guiding said wedge so that, on actuating said lever in one direction, said wedge causes the two friction cones to engage one after the other with the friction surfaces and to disengage one after the other from said friction surfaces on actuating said lever in the other direction, said means comprising a fixed guide-way and a roller movable therein and carried by said wedge.

3. The combination with a double cone friction clutch having two friction cones slidably movable in opposite directions on one shaft to be coupled, a spring between said cones, friction surfaces carried by the other shaft to be coupled, concentrically and laterally projecting hubs on said cones, members prevented from rotation on said hubs, a wedge between said members and a disengaging lever connected to said wedge; of fixed means for guiding said wedge so that, on actuating said lever in one direction, said wedge causes the two friction cones to engage one after the other with the friction surfaces and to disengage one after the other from said friction surfaces on actuating said lever in the other direction, said guide means being so arranged that, when the friction cones and surfaces are in contact, the wedge makes contact with one of said members but is out of contact with the other member.

4. The combination with a double cone friction clutch having two friction cones slidably movable in opposite directions on one shaft to be coupled, a spring between said cones, friction surfaces carried by the other shaft to be coupled, concentrically and laterally projecting hubs on said cones, members prevented from rotation on said hubs, a wedge between said members and a disengaging lever connected to said wedge; of means for guiding said wedge so that, on actuating said lever in one direction, said wedge causes the two friction cones to engage one after the other with the friction surfaces and to disengage one after the other from said friction surfaces on actuating said lever in the other direction, said means comprising a fixed guide-way and a roller movable therein and carried by said wedge, said guide-way being so arranged that, when the friction cones and surfaces are in contact, the wedge makes contact with one of said members but is out of contact with the other member.

In witness whereof I have hereunto set my hand in the presence of two witnesses.

PAUL DAIMLER.

Witnesses:
 ROBERT UHLAND,
 ERNEST ENTENMANN.